United States Patent [19]

Kasper

[11] Patent Number: 5,486,652
[45] Date of Patent: Jan. 23, 1996

[54] FLEXIBLE JUMPER AND METHOD OF MAKING

[75] Inventor: James J. Kasper, Sheffield Village, Ohio

[73] Assignee: Watteredge-Uniflex Inc., Avon Lake, Ohio

[21] Appl. No.: 391,008

[22] Filed: Feb. 21, 1995

Related U.S. Application Data

[62] Division of Ser. No. 12,253, Feb. 1, 1993, Pat. No. 5,393,951.

[51] Int. Cl.⁶ ............................................. H02G 15/02
[52] U.S. Cl. ................. 174/75 R; 174/15.7; 174/74 R; 174/128.1; 174/133 B
[58] Field of Search ..................... 174/75 R, 15.7, 174/19, 133 R, 133 B, 128.1, 74 R, 74 A, 88 B, 117 R, 149 B; 29/860, 861, 863; 219/78.16, 86.23, 86.24, 86.25, 86.31, 86.7, 76.12, 85.19, 86.1; 373/27, 29, 39, 40, 41; 428/594, 635, 636

[56] References Cited

U.S. PATENT DOCUMENTS

| | | | |
|---|---|---|---|
| 1,731,218 | 10/1929 | Adams | 174/74 R |
| 2,464,839 | 3/1949 | Fairfield | 219/86.25 |
| 2,943,133 | 6/1960 | Leathers | 174/15.7 |
| 3,073,948 | 1/1963 | Johnson | 219/137 R |
| 3,644,663 | 2/1972 | Carlson | 174/88 B |
| 4,163,117 | 7/1979 | Campbell et al. | 174/74 A |
| 4,455,659 | 6/1984 | Kasper et al. | 373/39 |
| 4,493,964 | 1/1985 | Shigemasa | 219/78.01 |
| 4,551,605 | 11/1985 | Numata et al. | 219/86.31 |
| 4,640,982 | 2/1987 | Kasper et al. | 175/75 R |
| 4,746,048 | 5/1988 | Kawaguchi | 29/861 |
| 5,393,951 | 2/1995 | Kasper | 174/133 B |

*Primary Examiner*—Morris H. Nimmo
*Attorney, Agent, or Firm*—Renner, Otto, Boisselle & Sklar

[57] ABSTRACT

A flexible laminated jumper is formed from a stack of half hard tempered copper sheets. Contact plates are clamped to opposite sides of one end of the stack, such plates being provided with short stress relief sections away from the end of the stack. The clamped end is positioned properly in a press welder so that the flat portion of the contact plates are gripped by graphite electrodes of a press welder. The gripped end of the stack is then press welded while the balance of the stack is cooled so that the heat from the press welding does not affect the temper of the sheets of the stack. This is preferably done by immersion in chilled water with the water level being in close proximity to the electrode. After the press welding, the entire stack is cooled and the still tempered stack is formed to the desired configuration. The application of the contact plates and press welding of the opposite end of the stacks is repeated, again with the balance of the stack isolated from the heat of the press weld to protect the temper. After cooling and final trimming, machining, cleaning and silver plating, the jumper is completed. Such jumpers form, for example, improved spot welding gun shunts which have lower resistance levels which improve the efficiency of the spot welding process and cooler shunt operating temperatures which not only provide longer shunt life, but more consistent quality, since the shunt resistance does not change over time.

5 Claims, 1 Drawing Sheet

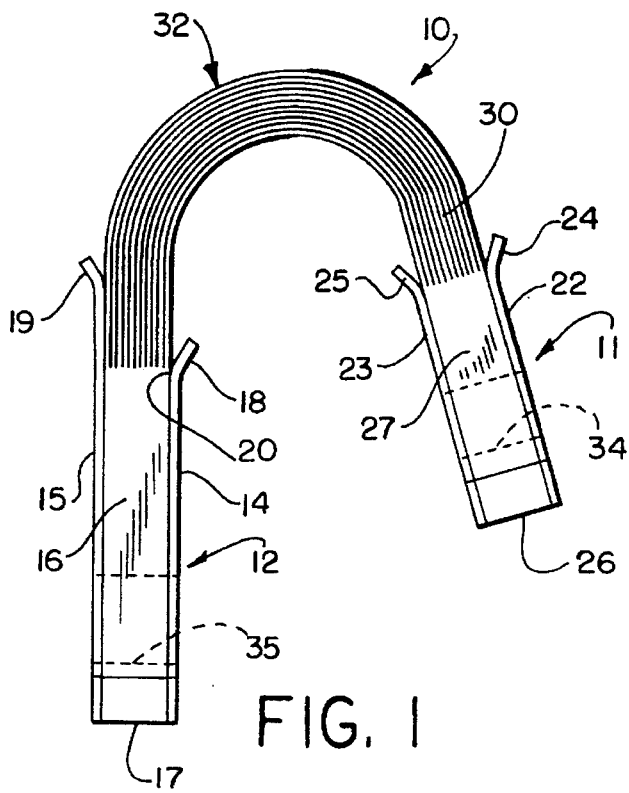
FIG. 1
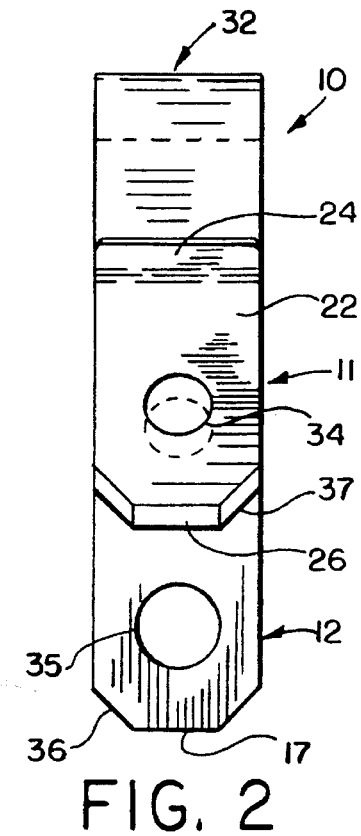
FIG. 2
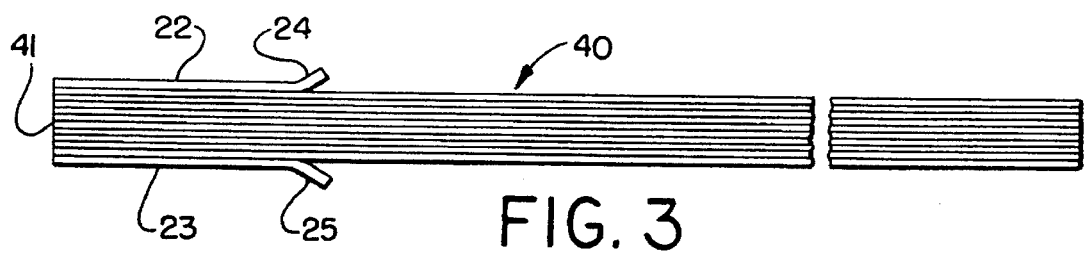
FIG. 3
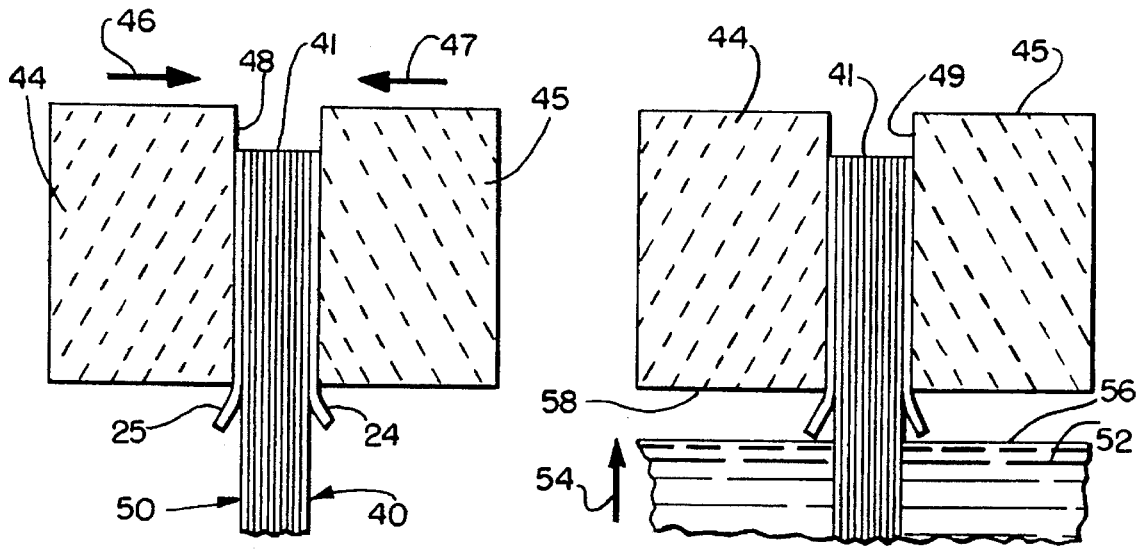
FIG. 4
FIG. 5

FLEXIBLE JUMPER AND METHOD OF MAKING

This is a divisional of application Ser. No. 08/012,253, filed on Feb. 1, 1993, now U.S. Pat. No. 5,393,951.

This invention relates generally as indicated to a flexible electric jumper and method of making, and more particularly to a flexible laminated jumper such as a gun shunt used in spot welding machines.

BACKGROUND OF THE INVENTION

Flexible electrical jumpers such as gun shunts used in spot welding machines may be made from tempered copper sheets or laminates such as half hard sheets. The tempered characteristic may be described as somewhat dead and they have little spring tendency. Current production techniques for such shunts utilize rivets to hold the laminates together. This results in a high initial resistance, and one which increases with time due primarily to oxidation of the copper laminates. The higher resistance reduces operating efficiency by increasing operating costs and also increases the shunt operating temperatures which reduces shunt life also accelerating oxidation. This change in resistance over the life of the shunt adversely changes the quality of the weld. It is accordingly desirable to have a flexible jumper such as a gun shunt which has the lowest possible resistance levels and lower power losses, which in turn produce more efficiency in the spot welding process resulting in lower operating costs. It is also important that the shunt have cooler shunt operating temperatures which result in longer shunt life and in consistent quality welds.

Press welding has been employed in the fabrication of cables and bus bars or arms, examples being seen in prior U.S. Pat. Nos. 4,455,659 and 4,640,982. The press welding process utilizes graphite electrodes which are movable with respect to each other to clamp the work at substantial pressure. The welding current passing from one electrode to the other through the clamped work creates a very high heat which approaches the fusion temperature of the metal of the clamped work. In fact, partial fusion does take place under the carefully controlled temperature and pressure of the process.

Excessive temperature or pressure can damage or destroy the work. Proper pressure welding of laminates for example can produce electrical resistance or loss characteristics essentially the same as in a solid conductor of the same material.

However, pressure welding creates so much heat that any temper in the metal of the laminates is altered or destroyed, which is no doubt one of the reasons that conventional jumpers such as gun shunts are formed with rivets. Accordingly, it would be desirable to make jumpers such as gun shunts with pressure welding techniques. However, to do so would require a pressure welding process where the balance of the item being welded is essentially isolated from the heat of the welding process.

SUMMARY OF THE INVENTION

A flexible laminated jumper is formed from a stack of half hard tempered copper sheets. Contact plates are clamped to opposite sides of one end of the stack, such plates being provided with short stress relief sections away from the end of the stack. The clamped end is positioned properly in a press welder so that the flat portion of the contact plates are gripped by graphite electrodes of a press welder. The gripped end of the stack is then press welded while the balance of the stack is cooled so that the heat from the press welding does not affect the temper of the sheets of the stack. This is preferably done by immersion in chilled water with the water level being in close proximity to the electrode. After the press welding, the entire stack is cooled and the still tempered stack is formed to the desired configuration. The application of the contact plates and press welding of the opposite end of the stacks is repeated, again with the balance of the stack isolated from the heat of the press weld to protect the temper. After cooling and final trimming, machining, cleaning and silver plating, the jumper is completed. Such jumpers form, for example, improved spot welding gun shunts which have lower resistance levels which improve the efficiency of the spot welding process and cooler shunt operating temperatures. This not only provides longer shunt life, but more consistent quality, since the shunt resistance does not change over time.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawing:

FIG. 1 is a side elevation of a flexible jumper such as a gun shunt in accordance with the present invention;

FIG. 2 is an end elevation of the shunt as seen from the right-hand side of FIG. 1;

FIG. 3 is a side elevation of a stack of tempered laminations with contact plates applied to one end of the stack;

FIG. 4 is a fragmentary illustration of the contact plate end of the stack vertically oriented and clamped between horizontally relatively movable pressure welding electrodes; and FIG. 5 illustrates the pressure welding operation with the balance of the partially formed jumper immersed in chilled water.

DETAILED DESCRIPTION OF THE PREFERRED EMBODIMENTS

Referring initially to FIGS. 1 and 2 there is illustrated a flexible laminated jumper in accordance with the present invention which is in the form of a gun shunt. A gun shunt is used in connection with spot welding machines, whether manual, or robotic, and supplies the required current to the movable electrode. The degree of movement may vary but, in any event, the gun shunt requires to be able to flex for each cycle of the welding machine.

The gun shunt is shown generally at 10 and is in the form of a highly flexible strap formed of copper sheets or laminations which are stacked together and formed at one end into a termination 11, and into a termination 12 at the opposite end. In its unflexed state, the jumper or gun shunt forms the asymmetrical almost U-shape seen in FIG. 1.

The termination 12 is formed by an inner contact plate 14, a somewhat longer outer contact plate 15, and a press welded section of the laminations 16 therebetween. Each contact plate away from the end 17 of the jumper is formed with a stress relief as indicated at 18 and 19 for the contact plates 14 and 15, respectively. The stress reliefs comprise outwardly bent sections which form a radius at the inside or obtuse corner. In this manner no sharp edge of a contact plate engages the exterior lamination during operation or fabrication of the jumper. The press welded termination or end section includes both of the contact plates 14 and 15 as well as the laminations therebetween as seen at 16 and extends from approximately the inner obtuse corner 20 of the shorter contact plate to the end 17 of the jumper.

The termination 11 is constructed in the same way except that the contact plates 22 and 23 are of the same length and include bent and radiused stress relief sections 24 and 25 at the ends thereof away from the end 26. The press welded section 27 includes the laminations from the end 26 to the interior obtuse radius or angle of the stress reliefs. The shunt between the press welded end sections or terminations comprises a stack of juxtaposed laminations unconnected to each other as indicated at 30 and bent into the almost U-shape configuration seen at 32. The bend can, of course, have some other configurations such as S, C, J, L or V-shape. Each press welded termination is machined to provide the mounting holes indicated at 34 and 35, respectively, and the corners at the ends are beveled or cropped as seen at 36 and 37. After machining and final cleaning, the terminations are silver plated.

The method of making such flexible shunt or jumper is seen more particularly with regard to FIGS. 3, 4 and 5. As illustrated in FIG. 3, a number of copper strips of a half hard temper are cut to the desired length and formed into stack 40 of the desired final thickness. The half hard temper is approximately halfway between a full hard or spring temper and a soft, dead or annealed material.

As seen in FIG. 3, the next step is to position the copper contact plates 22 and 23 in the manner indicated at the end of a stack. The strain reliefs 24 and 25 are positioned away from the end 41. In the illustrated embodiment, the contact plates or strips may be approximately 1/16" thick and are made of copper, but without the half hard temper.

As seen in FIG. 4, the thus assembled stack end is located properly in position between press welder electrodes 44 and 45 which are movable horizontally relative to each other as seen by the arrows indicated at 46 and 47, respectively. The electrodes have a flat pressure surface as seen at 48 and 49, respectively, between which the assembly is clamped. The stack end is positioned so that the stress reliefs 24 and 25 are as close as possible to the bottom edge of the flat pressure surfaces. In such vertical position or orientation, the, balance of the copper laminate stack assembly indicated at 50 hangs down in a pendant fashion.

A tank of water indicated generally at 52 beneath the electrodes is then elevated as indicated by the arrow 54 in FIG. 5. The water in the reservoir is preferably circulated through a chiller to be maintained at the proper low temperature. The water level indicated at 56 is brought as close as possible to the bottom 58 of the electrodes without contacting the electrodes. This close juxtaposition of the chilled water isolates the balance of the copper laminate stack assembly from the heat of the press weld.

With the parts in the FIG. 5 position, the press weld operation process proceeds to bond the copper laminate and contact strips together to form, if not a solid block of copper, an end or termination having the electrical characteristics thereof.

When press weld bond has been obtained, the graphite electrodes 44 and 45 are simply opened and the copper laminate stack with the one end welded simply drops into the reservoir.

When the press welded end has sufficiently cooled, the stack is then formed into the configuration seen in FIG. 1. Because of the half hard temper, the laminated stack may simply be wrapped around a templet to achieve the bent configuration shown. With such bent configuration achieved, the copper strips or plates 14 and 15 are then applied in the proper position and the press welding technique is repeated for the opposite end. Because of the half hard temper of the laminates being formed, the previously press welded end will sag or droop into the reservoir as in the FIG. 5 position so that the entire balance of the assembly is beneath the water level 56.

Since the laminations on the inside of the curve will normally stick out beyond the end 17 of the shunt, these excess length laminates are trimmed off in the final machining.

In order to produce the shunt of the desired flexibility, it is important that the half hard temper of the laminates be isolated from the heat of the weld. While the preferred embodiment illustrates immersion in chilled water, it will be appreciated that a shunt with the proper characteristics may be formed in a vertical press welder as long as the balance of the shunt away from the press weld electrodes is isolated from the heat of the weld. This may be accomplished by sprays or even chilled gas. However, the immersion in temperature controlled water is preferred because of the simplicities of the process steps and the apparatus for performing such steps.

The stress reliefs on the interior edges of the copper contact plates protect the laminates not only in operation, but also during the cold forming to the almost U-shape configuration shown. Such stress reliefs and the interior radii avoid any sharp corner contact with the outer laminations. It will also be appreciated that other forms of forming the half hard lamination stack may be employed such as by presses, or movable cylindrical dies. Because of the half hard temper of the metal material, manual shaping with certain templets is preferred. The half hard temper of the laminations also helps to reduce breakage of the laminates due to the cold forming.

It can now be seen that there is provided a press welded flexible laminated jumper or shunt which produces the lowest possible resistance levels. The low resistance, of course, means lower power losses, and more efficiency in the spot welding process. Better efficiency means lower operating costs. Also, because of the low resistance, the shunt operating temperatures are cooler lengthening the shunt life and, more importantly, providing consistent spot welds since the shunt resistance remains low and does not change over time.

I claim:

1. A flexible electrical laminated jumper comprising a stack of half hard conductive metal laminations, said stack being press welded at each end of the jumper to form a substantially solid block, said laminations between said ends maintaining their half hard temper, and terminations formed in the substantially solid blocks formed by the press welded ends.

2. A flexible electrical laminated jumper as set forth in claim 1 including contact plates on each side of the stack at each end, said contact plates also being press welded with the ends of the stack.

3. A jumper as set forth in claim 2 wherein each contact plate includes a stress relief at the end thereof remote from the end of the jumper.

4. A jumper as set forth in claim 3 wherein each stress relief comprises a section of the contact plate bent away from the laminations.

5. A jumper as set forth in claim 4 wherein each stress relief includes a radius ensuring no sharp edge of the contact plate is in contact with the adjacent laminations.

\* \* \* \* \*